United States Patent [19]

Ferguson

[11] Patent Number: 5,348,251
[45] Date of Patent: Sep. 20, 1994

[54] DIRIGIBLE AIRSHIP

[76] Inventor: Frederick D. Ferguson, P.O. Box 599, Station B, Ottawa, Ontario, Canada, K1P 5P7

[21] Appl. No.: 43,158

[22] Filed: Apr. 5, 1993

Related U.S. Application Data

[63] Continuation of Ser. No. 757,059, Sep. 9, 1991, abandoned.

[51] Int. Cl.⁵ .............................................. B64B 1/02
[52] U.S. Cl. ........................................ 244/30; 244/29; 244/96
[58] Field of Search ................ 244/30, 24, 29, 95–99, 244/3, 131

[56] References Cited

U.S. PATENT DOCUMENTS

| | | | |
|---|---|---|---|
| 43,449 | 7/1864 | Andrews | 244/30 |
| 922,549 | 5/1909 | Wheeler | 244/52 |
| 1,004,662 | 10/1911 | Kuenzel | 244/30 |
| 1,144,578 | 6/1915 | Andersson | 244/30 |
| 1,372,925 | 3/1921 | Andersson | 244/30 |
| 1,594,073 | 7/1926 | Short | 244/30 |
| 1,623,865 | 4/1927 | Doncheff | 244/30 |
| 1,718,109 | 6/1929 | Brown | 244/30 |
| 1,818,138 | 8/1931 | Howland | 244/3 |
| 3,079,106 | 2/1963 | Whitnah | 244/30 |
| 3,180,590 | 4/1965 | Fitzpatrick | 244/30 |
| 3,232,562 | 2/1966 | Cella | 244/30 |

FOREIGN PATENT DOCUMENTS

| | | | |
|---|---|---|---|
| 224323 | 9/1908 | Fed. Rep. of Germany . | |
| 409164 | 4/1910 | France | 244/30 |
| 413494 | 3/1911 | France | 244/30 |
| 2145703 | 2/1973 | France . | |
| 04247 | of 1909 | United Kingdom . | |

Primary Examiner—Margaret A. Focarino
Assistant Examiner—Christopher P. Ellis
Attorney, Agent, or Firm—Beveridge, DeGrandi, Weilacher & Young

[57] ABSTRACT

An airship in the form of a self-powered, elongated dirigible which comprises at least three sections connected together by joints. The sections including a front section with propulsion devices and control surfaces, at least one intermediate section designed to carry a payload and a rear section with control surfaces. The joints allow limited articulation between sections under gust conditions and tend to return the sections to aligned condition in calm air. A cover may provide a streamline exterior shape for the airship; alternatively the sections may have rims which mate together when there is no articulation to provide a smooth exterior shape.

21 Claims, 11 Drawing Sheets

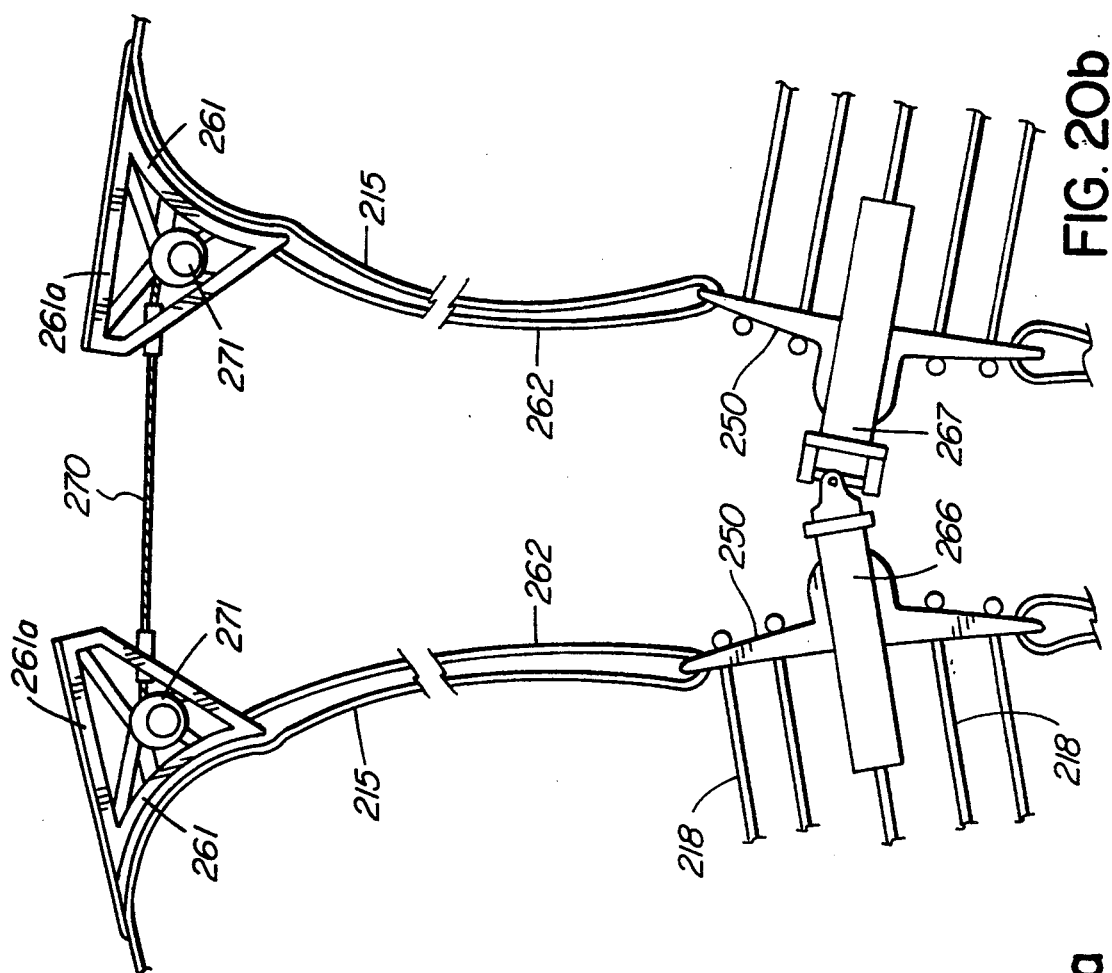
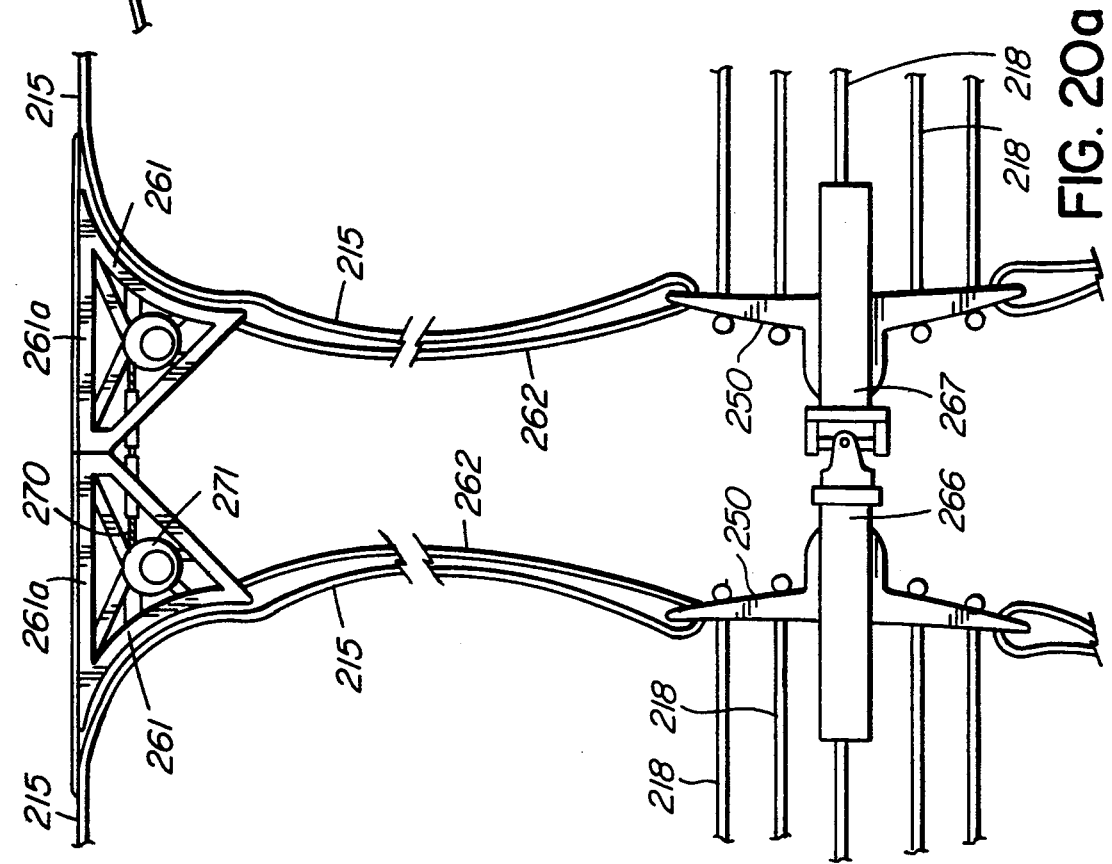

DIRIGIBLE AIRSHIP

This application is a continuation of application Ser. No. 07/757,059, filed Sep. 9, 1991, now abandoned.

BACKGROUND OF THE INVENTION

1. Field of the Invention

The present invention relates to a self-propelled and steerable airship (a so-called "dirigible").

2. Related Art

Conventionally, large airships have been made with buoyant gas held in gas bags contained within a rigid elongated enclosure; this requires a fairly complex structure which is expensive to build. Also, such structures are subject to high stress when windy or stormy conditions are encountered, and when landing and taking off, and there have been disastrous failures of airship structures in these conditions. The stress problems become more serious as the size increases, partly due to well known effects of scaling up structures, and partly because the effect of wind shear increases with the length of the airship. Small airships, the so-called blimps, are made without any rigid structure but these cannot be made in an ideal streamlined shape and are structurally unsafe beyond a certain size.

SUMMARY OF THE INVENTION

The present invention avoids the overall rigidity and resultant structural problems of the conventional large dirigible by using a series of sections flexibly connected together.

In accordance with the present invention, a self-powered, elongated dirigible airship comprises at least three gas containing sections, each section having a gas bag or balloon with a fore-and-aft axis, the three sections being connected by articulated joints means which provide a streamline exterior shape for the airship at least when the sections are aligned. When the airship is subjected to substantial bending moments it can bend; accordingly the components of the airship are not subjected to very large bending moments or compressive forces. The sections include a front section with propulsion means and control means, at least one intermediate section with load carrying means but without propulsion means, and a rear section with control surfaces.

The joint means may include outer cover means bridging any gaps between the sections and providing a streamline exterior shape for the airship.

The joint means preferably includes extensible elements which may be elastic cables, or may be cables connected to powered winches. Such elements are preferably arranged at close to the maximum radius of the airship.

The front section and rear section are tapered and the intermediate section or sections are of substantially constant diameter. A plurality of identical intermediate sections may be used to provide modular construction.

The sections may each include a structural member extending along the axis, with articulated joints connecting the ends of the structural members.

Each section of the airship contains ballasting means whereby it can be made neutrally buoyant. The intermediate section or sections, which will be the only sections carrying substantial pay load, are made capable of neutral buoyancy both loaded and unloaded. In order to minimize effects of temperature and atmospheric pressure on the buoyancy, either:

(1) Gas containing sections are used comprising relatively small bags or balloons which contain the buoyant gas (normally helium) at a pressure sufficiently above atmospheric pressure that the shape and size of the bag or balloon is substantially unaffected by normal changes in atmospheric pressure and temperature including those caused by ascent or descent; or (2) Gas bags or balloons are used which contain internal ballonets for receiving compressed air; the air acting as ballast and being supplied at suitable pressure so that the internal pressure of the gas bag or balloon always exceeds the atmospheric pressure by a suitable amount, allowing outer dimensions to be relatively constant.

Concerning the first option, balloons containing buoyant gas at pressures substantially higher than atmospheric, so-called "superpressure" balloons, have previously been used as free flight balloons for atmospheric monitoring and for small manned balloons. While such balloons were spherical, more complex forms of superpressure balloons and lifting devices incorporating such balloons are described in U.S. Pat. Nos. 4,696,444 (issued Sep. 29, 1987) and 4,711,416 (issued Dec. 8, 1987), both to Regipa. Both of these patents show superpressure balloon structures of cylindrical shape. Although the latter balloons are described as superpressure, they also contain air ballonets, thus combining the two options above.

One form of my airship suitable for small sizes of airship utilizes a plurality of gas containing sections in the form of spherical, balloons which are flexibly connected together as described above and enclosed within a casing having a generally cylindrical central section which provides a streamlined shape similar to that of known dirigibles. Such spherical balloons may be superpressure balloons normally designed to accommodate safely an internal pressure of say 35 millibars above atmospheric pressure or higher. At least a portion of the space between the balloons of adjacent sections and within the cover is taken up with bags containing lifting gas at lower pressures.

In large sizes of airship superpressure bags are uneconomical and probably unsafe, and accordingly each gas containing section includes a gas bag for buoyant gas at just above atmospheric pressure combined with a ballonet for receiving air ballast, compressor means being provided to admit air for descending. Admission of air in this way reduces the gas storage space in the section so increasing the gas pressure to balance the increase in atmospheric pressure as the airship descends, and maintains the outer dimensions essentially constant without requiring high pressures. The intermediate gas containing section or sections may be cylindrical, preferably being fairly short, i.e. about 1:1 and in any event less than 1.5:1 in length to diameter ratio. Use of cylindrical sections minimizes gaps between sections which need to be bridged by the cover means to give a streamline shape. Where the ends of adjacent sections fit well together, no cover means is necessary, since gaps only occur under extreme conditions.

Preferably, the airship has at least four articulated gas containing sections, each of which is circular in cross section. Each section may have a rigid axially extending structural member, the four sections being connected by universal joints which connect adjacent ends of the structural members and by cables which connect the outer peripheries of adjacent sections. The universal joints maintain the proper intersecting relationship of the axes of the sections during bending. The cables may be tensioned so as to prevent any articulation of the airship sections until a predetermined bending force is exceeded. However, use of a rigid axle member is not essential, and a flexible tensile member may alternatively be used to hold the intermediate sections to a predetermined length.

The airship of this invention will preferably use a balloon or gas bag/ballonet combination designed so that it can be filled with helium at ground level and can hold all the helium while operating at up to 12,000 ft. which will be the maximum altitude for unloaded flight. Although provision is made for dumping helium in the event of excess internal/external pressure differential, it is not envisaged that dumping will normally occur. When the airship is not carrying its normal load, it will carry ballast such as water or loads held by cargo-carrying brackets.

BRIEF DESCRIPTION OF THE DRAWINGS

The invention will be more particularly described with reference to the accompanying drawings, in which:

FIG. 20a and 20b shows details of the connecting means between adjacent sections of the third airship.

DESCRIPTION OF THE PREFERRED EMBODIMENTS

Figure 1:
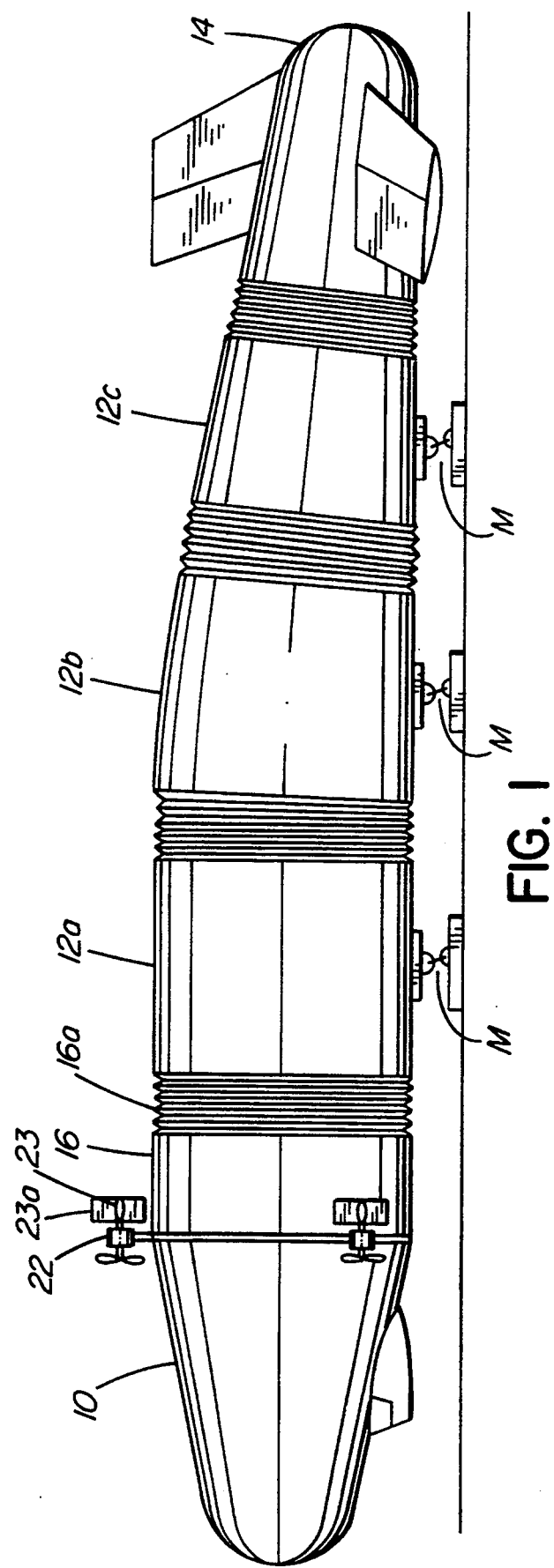
FIG. 1 is a side view of a first airship in accordance with the present invention.
Figure 2:
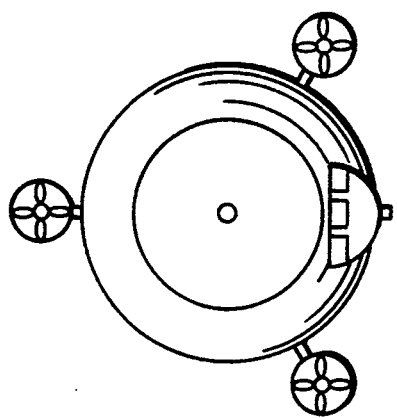
FIG. 2 is a front end view of the same airship.
Figure 3:
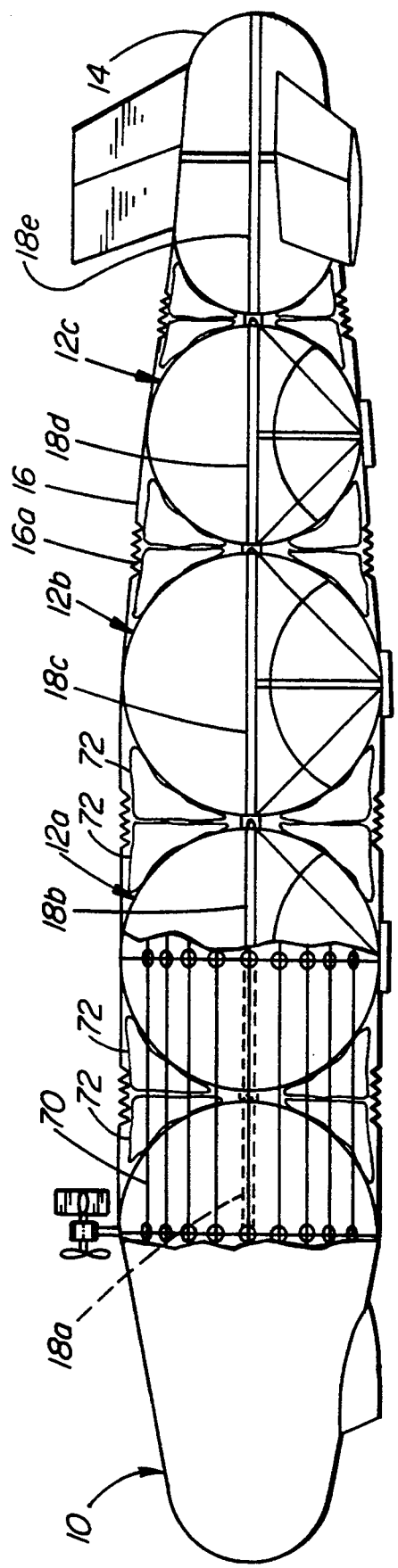
FIG. 3 is a partly cut away and partly longitudinal sectional elevation of the same airship as shown in FIG. 1.

The airship as shown in FIGS. 1-3 comprises five sections, namely a front end section 10, three intermediate sections 12a, 12b and 12c, and a rear end section or tail section 14. These five sections are all linked together by articulated joint means, and are also connected by cables at their outer peripheries, which cables control the flexing of the airship, as will be described. An outer cover 16 connects the sections and provides a generally streamlined exterior shape for the airship; the cover nevertheless having bellows-like corrugated sections 16a forming part of the joint means and allowing bending of the airship without substantial crumpling of the cover. Each section is circular in cross section and each forms a surface of revolution about a rigid, hollow axially extending structural member 18a, 18b, 18c, 18d and 18e extending along its axis, adjacent ends of the structural members being connected by universal joints. Each of the sections 12a, 12b, and 12c has mooring means indicated at M whereby it can be moored to ground fixtures as indicated.

Figure 4:
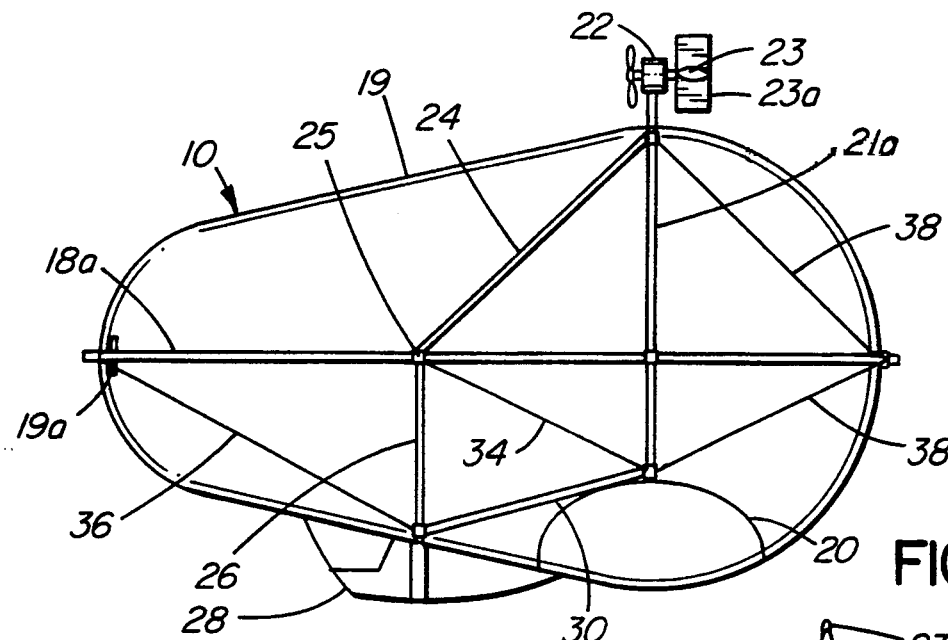
FIG. 4 is a side view in section of the forward end section of the airship.
Figure 5:
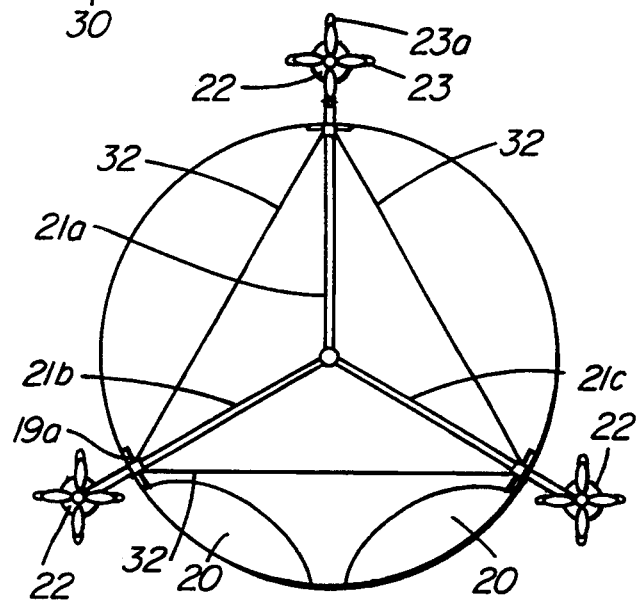
FIG. 5 is a frontal view of the first section of the airship, also in section.
Figure 6:
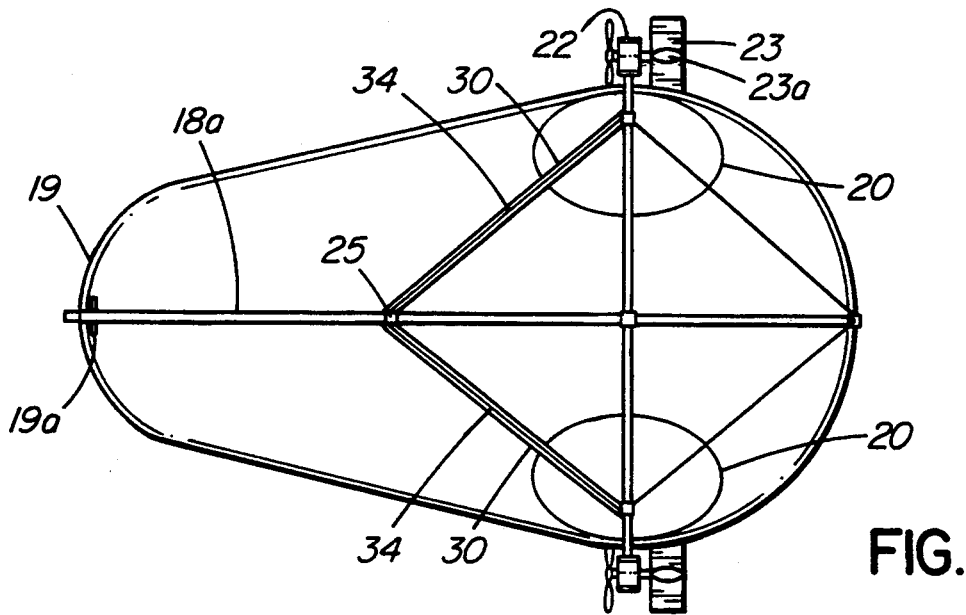
FIG. 6 is a top plan view of the forward end section of the airship, also in section.

FIGS. 4–6 show the front end section 10, or so called "control" section, which carries the engines, crew quarters and controls for the airship; it carries no pay load as such, although some fuel will be carried in this section (see below). The section includes a gas containing bag 19 having a hemispherical front end and a hemispherical rear end, and having a frusto-conical intermediate part which diverges from front to back. Bag 19 contains two balanced ballonets 20 connected to a compressor means for air ballasting as explained above. Sufficient air pressure is maintained within the ballonets (and therefore within the buoyant gas which is at the same pressure) that the bag maintains essentially fixed dimensions and shape. A tube connects the two ballonets. The structural member 18a passes a short distance out of the front and rear ends of the gas bag, and is anchored to the bag material by means of flanges 19a surrounding the member 18a. The rear end of member 18a is connected to the front end of the next structural member 18b by a universal joint, as will be described more fully below. Member 18a forms part of a framework of tubular members, which framework includes:

(1) Three radial members 21a, 21b, 21c which are connected to member 18a at the centre of curvature of the rear most part of the bag, and which project out through the gas bag being spaced from each other at 120° intervals, the upper member 21a being vertical. Each of these structural members has a flange 19a attached to the bag material. The outer end of each member carries an aircraft type engine 22 at its outer end, so that its propeller can rotate just clear of the gas bag. Behind each engine is a cross-vane aileron 23 and rudder 23a, providing yaw, pitch and roll control. At extreme low speeds in still air individual thrust trim to each engine is capable of turning the airship.

(2) A member 24 extending from a central point 25 on member 18a to a point near to the outer end of radial member 21a, being within the confines of the bag, and assisting the member 21a in supporting the upper engine 22.

(3) A member 26 extending down vertically from point 25 and having a lower end forming a mounting for a crew cockpit or gondola 28.

(4) Two members 30 extending downwardly and inwardly from adjacent the outer ends of members 21b, 21c to meet the member 26 just above the gondola, and within the bag. The framework also includes the following flexible cables used to brace the structural members described, i.e.

(1) three cables 32 extending between the end portions of the members 21a, 21b, 21c, just within the confines of the bag to hold these members at the correct angular position;

(2) two cables 34, shown in FIG. 4, extending between point 25 and portions of the members 21b, 21c, just inside the bag material;

(3) cable 36 extending from the front end of member 18a down to the junction between the members 26 and 30; and (4) three cables 38 extending from the end portions of members 21a, 21b, 21c, just within the bag material, to the rear end of the member 18a just inside the bag material.

This arrangement provides rigid support for the engines 22 and the gondola 28. This control section includes, in the gondola, control means for rudders and or ailerons such as 23, 23a and others carried by the tail section to be described. The engines 22 have fixed mounts but are independently controlled for speed and propeller pitch so that they can be used to alter or to assist in altering the orientation of the airship. Fuel for the engines will be carried in this control section and also in section 12a following.

The control section 10 is essentially an independent unit having all necessary power means, control (by rudders 23a and ailerons 23), fuel, and ballast means (by ballonets 20), to allow independent, controlled flight. The section is connected to the next following section 12a by separable coupling means, and is sufficiently self contained that, in an extreme emergency, this section may be separated from the remainder of the airship and land safely.

Figure 7:
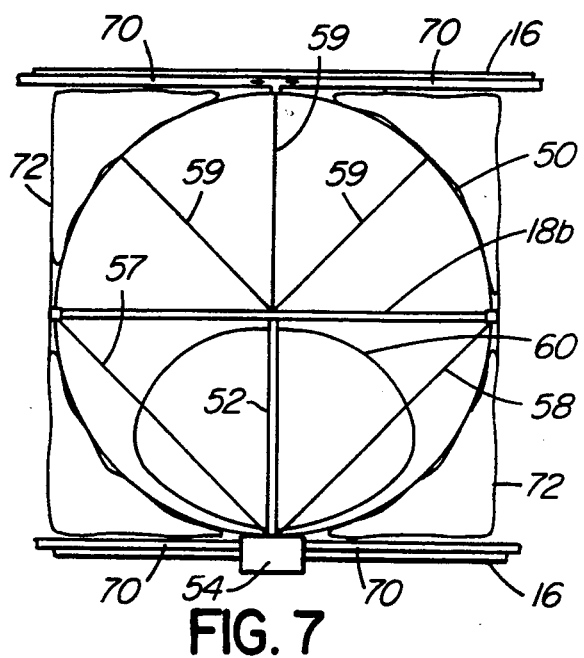
FIG. 7 is a sectioned side view of the second section of the airship; the third section being the same.
Figure 8:
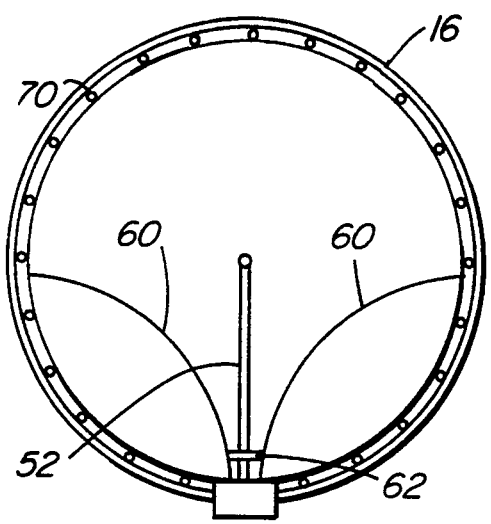
FIG. 8 is a cross sectional view of the first section of the airship.

FIGS. 7 and 8 show the leading intermediate section 12a, or second section, which is essentially a passive load supporting part. The next intermediate section or third section 12b is identical, and the third intermediate section 12c (fourth section of the airship) is structurally the same but smaller in diameter. These sections have no propulsion means nor any control surfaces.

Figure 7A:
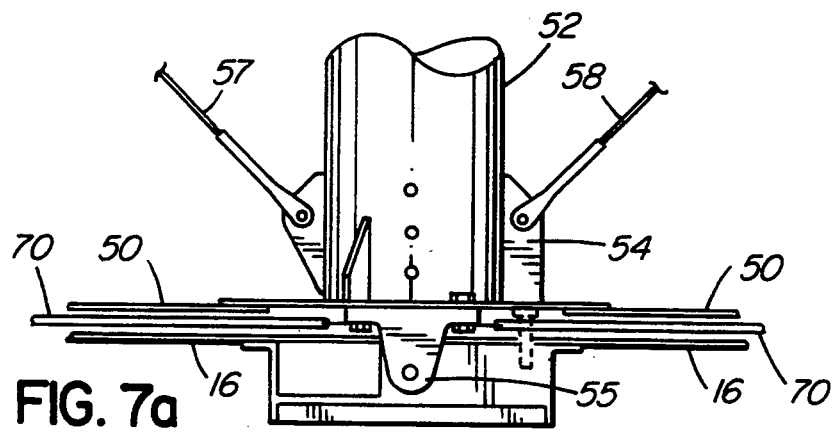
FIG. 7a is a detail of FIG. 7, showing the load supporting arrangement.
Figure 9:
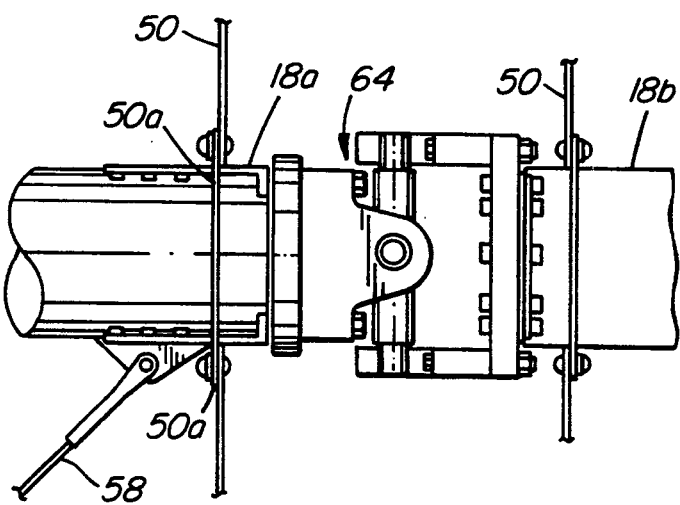
FIG. 9 is a side view of the junction parts of the forward end section and second sections of the airship.

As shown, the section 12a has a spherical balloon 50 traversed by the axial fore and aft member 18b which is connected to adjacent members 18a and 18c by joints as described below with reference to FIG. 9. FIG. 9 also shows the flanges 50a by which the ends of member 18b are connected to the balloon fabric. The member 18b is connected by vertical strut 52 to a load carrying bracket 54, shown in detail in FIG. 7a, which bracket has a pair of downwardly projecting lugs 55 suitable for attachment to a payload. This load carrying part, which can also support a fuel tank, will be seen to be independent of any load carrying means of adjacent sections so as not to interfere with flexing of the airship. The bracket 54 is also connected to the member 18b by cables 57, 58 extending respectively to the front and rear end of the member 18b, as shown in FIG. 7a. Additional cables, for example as shown at 59, connect upper parts of the sphere to the member 18b, thus transmitting the lifting forces to the load via this member. The balloon 50 has two internal air ballonets which allow air to be used as ballast; the outlines of these ballonets are indicated at 60 in FIGS. 7 and 8. The ballonets are symmetrically arranged relative to the longitudinal centre of the balloon, and the perimeter of each ballonet is connected to the interior of the balloon along a generally elliptical path which extends up to just below the centre line of the balloon. The two ballonets are connected by a tube 62, and are also connected to an air compressor, allowing air to be compressed into the ballonet to provide ballast. Sufficient air pressure is maintained that the spherical balloon maintains essentially fixed dimension and shape when ascending or descending; the ballonets can also compensate for changes in atmospheric pressure and temperature.

FIG. 9 shows diagrammatically the structure connecting the balloon 50 and the first gas containing section; similar junctions are used between all of the sections. As shown, the axial structural members 18a, 18b, are connected together by a universal joint 64 of the cardan type.

As shown in the cut away portion of FIG. 3, the outer peripheries of the airship sections are connected by extensible cables 70 in the form of elastic ropes which are anchored to the peripheries of the sections as seen in the fore and aft view, i.e. at the largest diameters. These cables also seen in FIGS. 7 and 8 are pre-tensioned so that the two sections only pivot relative to each other when a predetermined minimum bending moment is exceeded; this prevents unwanted oscillation of the parts which would otherwise occur in light winds. These cables, which are preferably at least 20 in number between each pair of adjacent sections, form a cylindrical support for the fabric cover 16 which is attached to the cables to maintain its cylindrical shape. As will be evident from FIGS. 3 and 8, the cables 70 are generally equally spaced around the periphery of the joint between adjacent sections, and this arrangement, combined with the use of the cardan joint, allows bending between the sections to occur in any plane.

As shown in FIGS. 3 and 7, the spaces between the first section 10 and the second section 12a, within the cables, and between sections 12a and 12b, are largely occupied by annular helium containing balloons 72, which contain the helium at a pressure close to atmospheric, i.e. at least slightly below that of the balloon 50. Each of these balloons 72 has an external cylindrical surface, an internal surface conforming to the adjacent spherical balloon, and flat faces contacting each other. These balloons allow movement of the helium from one side of the airship to the other, so collapsing and expanding as the sections move relative to each other. The small spaces near the ends of the member 18b, which are surrounded by these annular balloons, and also small spaces between the balloons and the cover 16, contain air and are open to air at the front end of the airship via the hollow structural members 18a and 18b.

The joints between the other sections are similarly formed. The axial members 18a, 18b, etc. provide a duct communicating the air outside the balloon to the small spaces between each adjacent section not occupied by the annular helium balloons.

Figure 10:
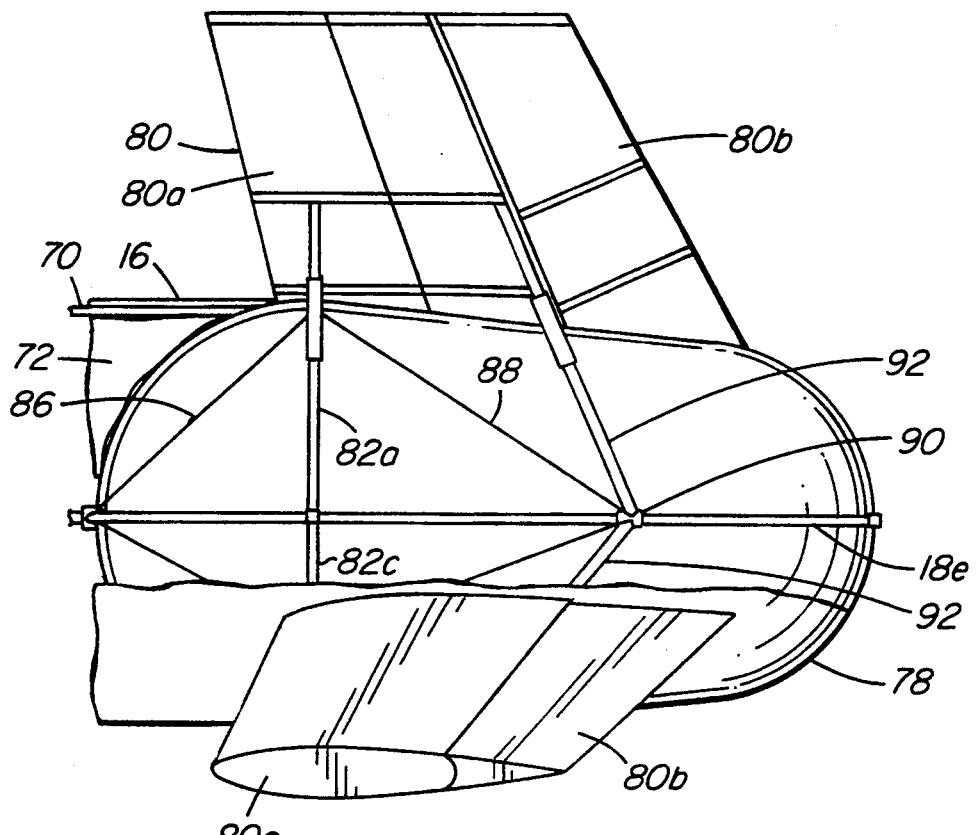
FIG. 10 is a side view of the tail end section of the airship, partially sectioned.
Figure 11:
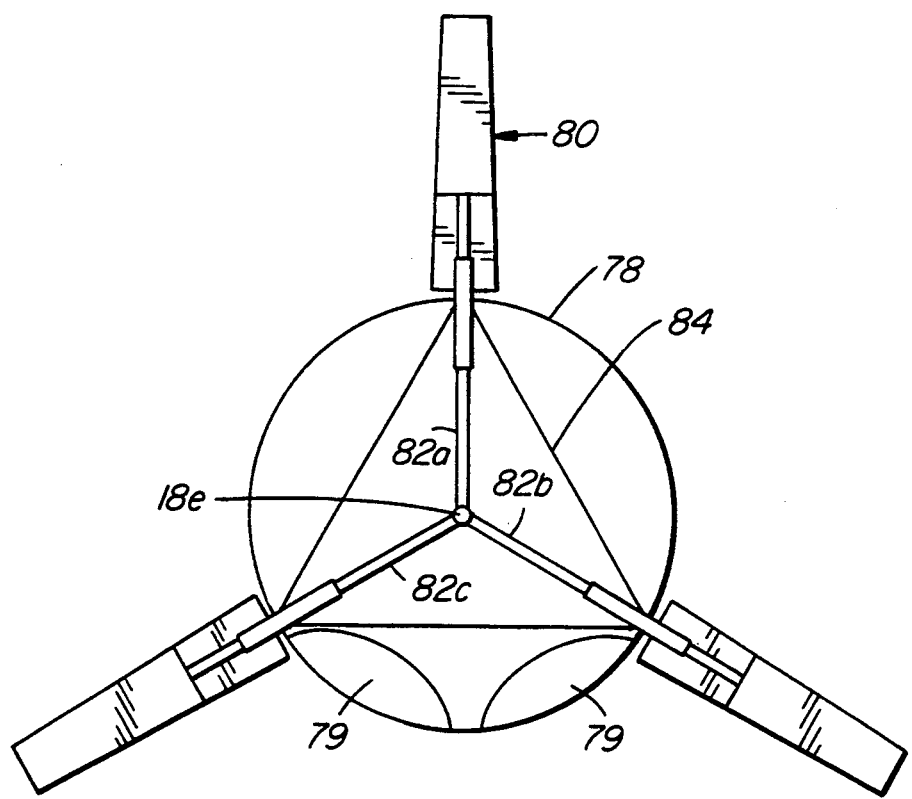
FIG. 11 is a front end view of the end section of the airship, also partially sectioned.

The tail section 14 is shown in FIGS. 10 and 11. This is similar to the front end section in comprising an elongated balloon 78 having a forward hemispherical end, a tapering frusto-conical surface merging with the forward end and leading to a smaller hemispherical surface at the rear end. Internal air ballonets 79 are provided, along with an air compressor, as for the other sections. The tail section includes three tail planes 80 set at 120° relative to each other, and which include an upper vertical tail plane. These tail planes (or fins) are swept forward so that the centre of gravity of the tail section is near to the centre of buoyancy. Each tail plane has a fixed part 80a and a rudder or aileron section 80b. The fixed part in each case is carried by a radial strut 82a, 82b and 82c extending from the rear structural member 18e at a point adjacent the centre of the front hemispherical surface, and projecting out through the balloon surface to a support point adjacent the centre of the tail plane part 80a. The members 82a, 82b and 82c are braced by cables 84 shown in FIG. 11 which connect end portions just inside the balloon fabric, and are also braced by forward and rearward cables 86 and 88 shown in FIG. 10 which connect the same end portions to the front end of the member 18e, and a rear end connection point 90 which is adjacent the centre of the rear hemispherical surface of the balloon. This connection point 90 also serves as a mounting for three support members 92 which project both radially and forwardly and support the rear ends of the fixed rudder portions. These support members 92 also provide hinge means for the rudder parts 80b. The rudders are controlled from the control section by electro-mechanical linkages.

Figure 12:
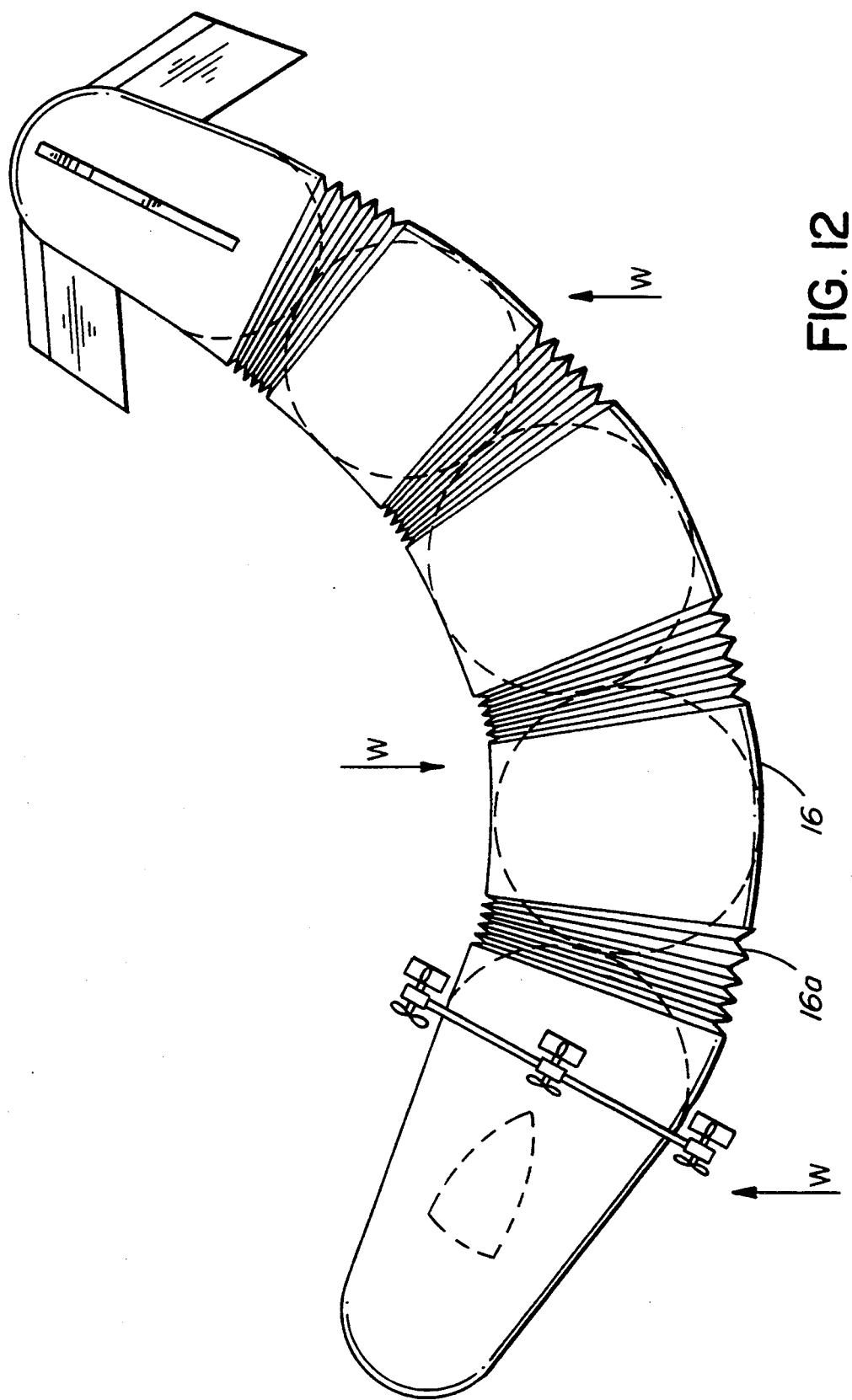
FIG. 12 is a top view of the airship showing how it can bend in severe wind conditions.
Figure 13:
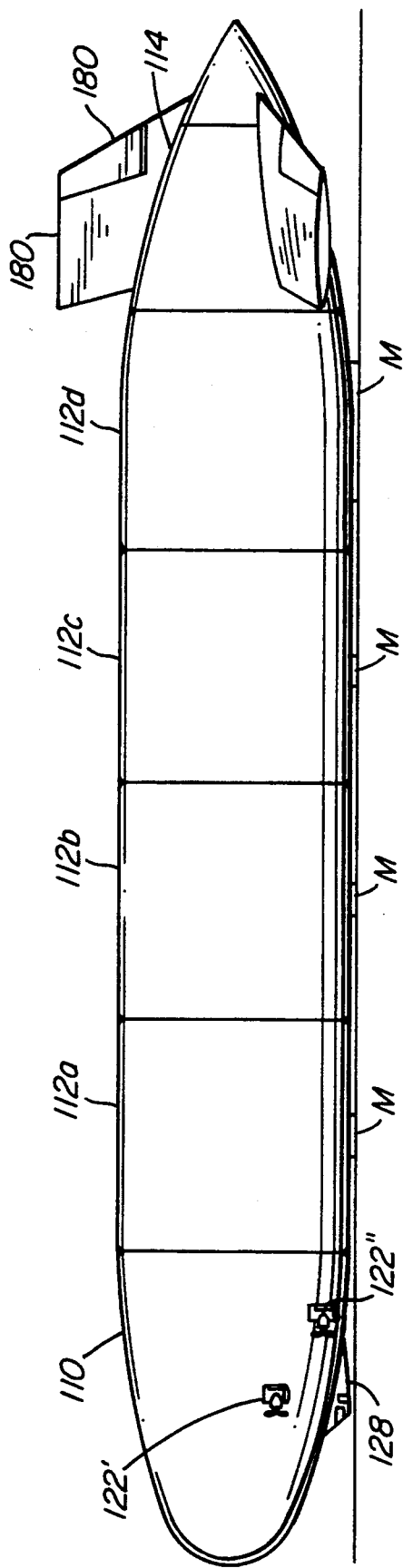
FIG. 13 shows a side elevation of a second, larger airship.
Figure 15:
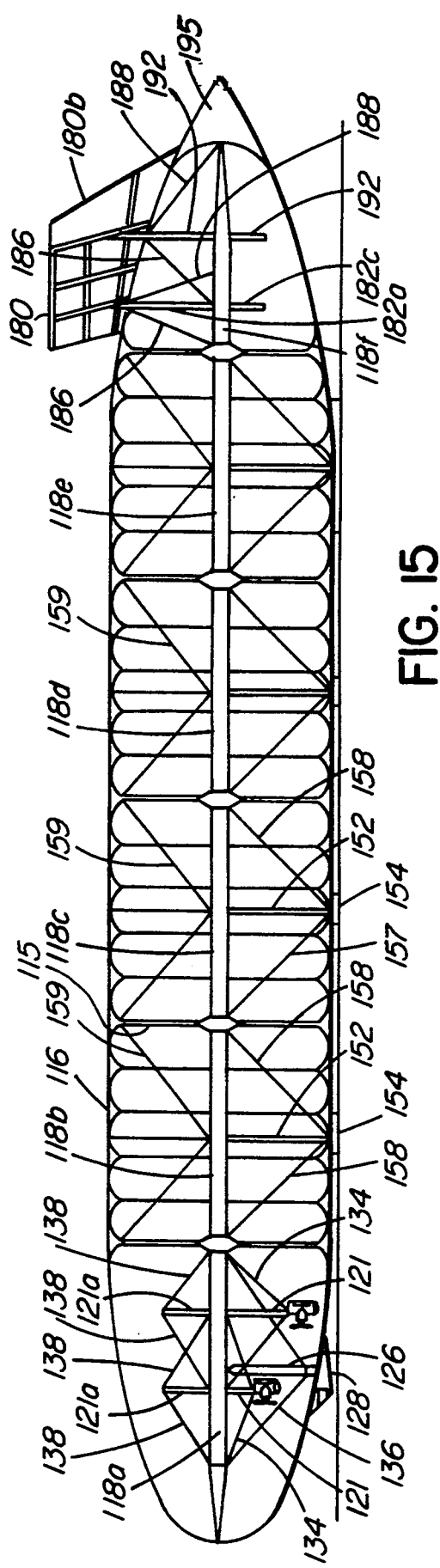
FIG. 15 shows a sectional elevation through the second airship.
Figure 14:
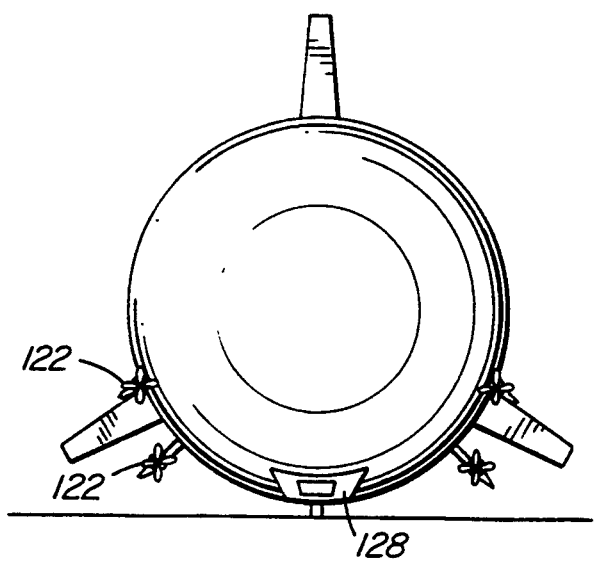
FIG. 14 shows a front elevation of the second airship.
Figure 16:
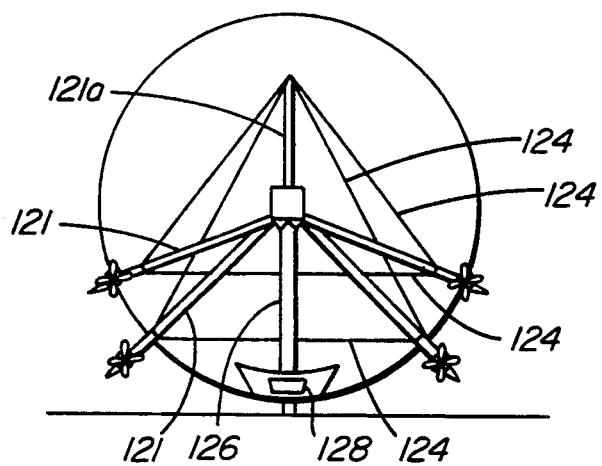
FIG. 16 is a view of the front of the second airship with cover parts removed.

FIG. 12 illustrates the ability of the airship to bend in windy conditions; local wind gusts are indicated by arrows W. Bending is accommodated by the corrugated sections 16a of the cover, by the universal joints which connect the structural members 18a, 18b, etc.; and by the movement of gas within the low pressure helium balloons 72 from one side of the balloon to the other. Bending is resiliently resisted by the elastic cables 70. Each section of the airship can bend relative to the next adjacent section by at least 20°; preferably up to about 30°, this bending being limited by the main balloons pressing against each other in the extreme position shown.

It will be apparent from considering FIG. 12 that in this condition of high wind shear no structural element is subjected to large bending forces and the only parts subjected to substantial compressive forces are the balloons, in which forces are well distributed. The wind force on the centre of the airship is largely resisted by the tension in structural members 18a, 18b, etc., which can easily be made strong enough to resist the tensile forces. Thus, the airship has the same kind of strength to weight advantage over a conventional rigid airship as a suspension bridge has over a standard girder bridge.

In the embodiment described, the gas containing sections are maintained at substantially constant dimension and shape by using the ballonets to maintain a suitable differential between internal and external pressure; about 10 millibars (0.157 psi) overpressure is suitable. However, superpressure balloons may be used for all of the gas containing sections, and especially for the spherical balloons, at least for small sizes of airship. This may avoid the need for ballonets.

Cables 70 have been described as elastic. However, substantially inelastic cables may be used in association with powered winches, to allow complete control of the flexing. The winches will preferably include damping means to minimize oscillatory motion. In either case, some prestressing or like means would be provided so that the craft can resist small forces without any bending.

Since mooring means M is provided for each load carrying section of the airship, this can be secured in place firmly on the ground, unlike with conventional airships which are moored by a mast at the nose. In order to allow for different orientation of the ground mooring points, to accommodate varying wind directions, these may be mounted on circular rail tracks. Mooring at several sections allows the airship to take off gradually, front sections being released and rising first, so that the whole airship has assumed a climbing attitude before the tail is released. As the forward sections are released, the engine and their rudders are operated so as to bring the craft into the wind.

Although tail plane or fin formations are shown only on the tail section, in large sizes of airship it is contemplated that other sections of the airship may have these.

FIGS. 13 to 17 show a second, larger version of the airship. This has many parts which correspond to those of the first airship and which are labelled with similar reference numerals increased by 100.

Figure 17:
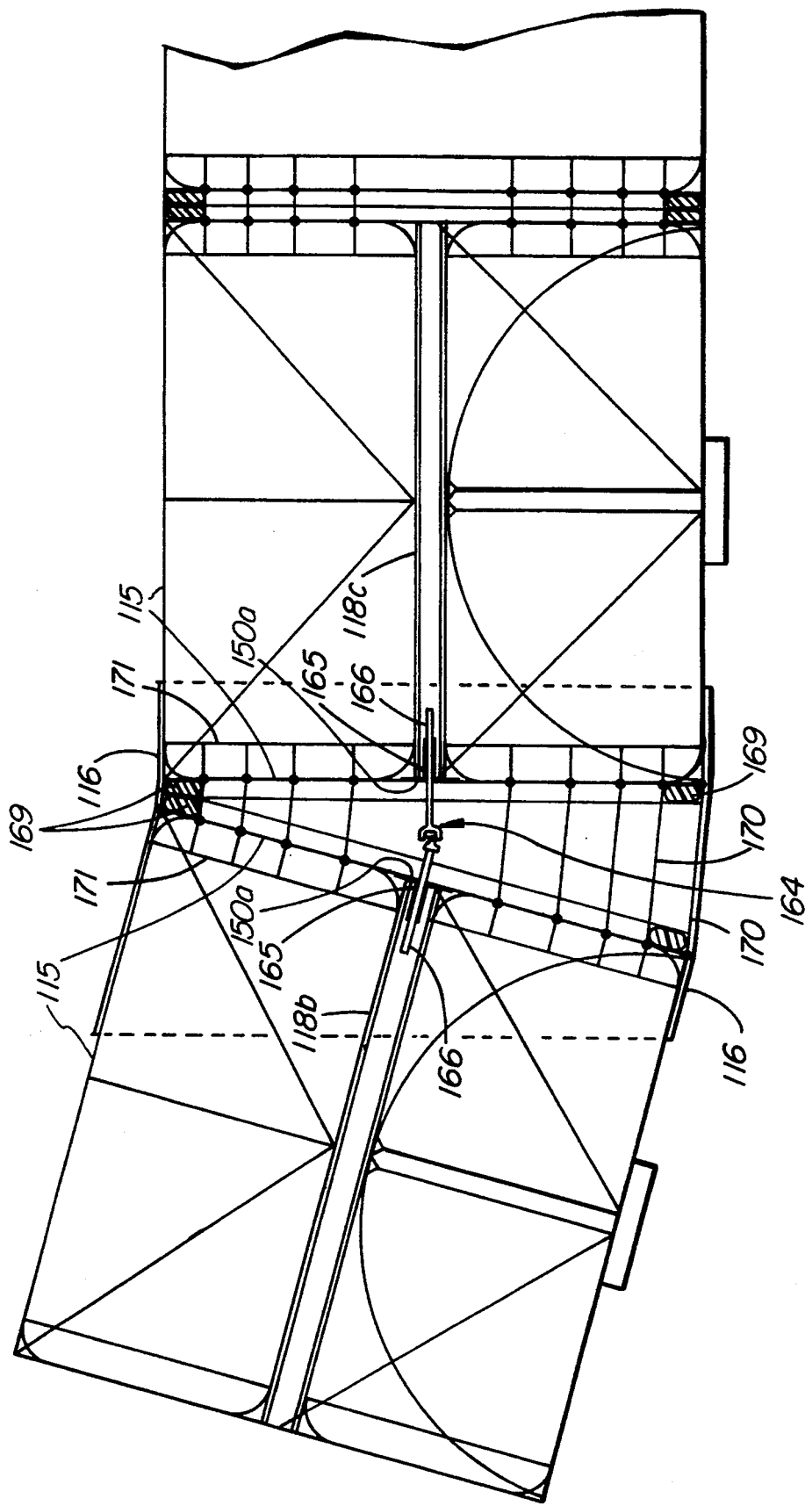
FIG. 17 shows a detail of a connection between two sections of the second airship.

The airship has a front section 110, four intermediate sections 112a, 112b, 112c and 112d, and a rear or tail section 114, each being circular in cross section and having a rigid, axially extending member 118a, 118b, 118c, 118d, 118e and 118f in the form of a hollow girder. The intermediate sections are each of generally cylindrical form and mating end surfaces of all sections are substantially flat. Joints between the sections, which are described in more detail below with reference to FIG. 17, are enclosed by outer cover portions or skirts 116, to maintain a streamline shape. Each section 110, and 112a, 112b, 112c, and 112d has mooring means M.

Front section 110 carries the engines 122 and gondola 128. Engines 122 are all located below the centre line of the airship and include a forward upper pair and a rearward lower pair; each pair of engines being carried by lower radial members 121 which pass out of the bag material and which terminate in a short wing sections 122′, having flaps 122″ which are movable to control the thrust direction. The radial members are stayed by fore and aft cables 134 and by lateral cables 124 including upper cables held by king posts 121a extending upwardly from member 118a, themselves stayed by cables 138. The gondola 128 is held by a girder 126 stayed by cables 136. The front section has ballonets for air which are not shown but are similar to those shown at 20 in FIGS. 4–6.

Turning now to the intermediate sections 112a, etc., each is in the form of a cylindrical balloon the exterior casing 115 of which has both circumferential, hoop like reinforcements and longitudinal reinforcements. The sections have a length to diameter ratio close to unity and in any event less than 1.5:1.

The sections each have two discrete ballonets; these are not shown but will be situated below the centre line of the airship, generally as previously described with reference to FIGS. 7 and 8. The gas bag is designed for a pressure of about 10 millibars or about 0.157 psi.

The internal structure of the intermediate sections is similar to that in the first airship, namely a vertical strut 152 extending down to the load carrying bracket 154, braced by fore-and-aft cables 157 and 158. Further cables 159 connect the centre of member 18b to the upper parts of the gas bag to transmit lifting forces to the strut 152 via member 118b.

FIG. 17 shows a joint between two intermediate sections, which is also similar to joints between the intermediate sections and the end sections. At the adjacent ends of two members 118b, 118c are plates 150a which anchor the longitudinal centres of the gas bag fabric, and these carry tubes 165 extending internally of the ends of members 18b and 18c. Tubes 165 slidably receive shafts 166; the two shafts 166 are connected by a universal cardan type joint 164 as illustrated in FIG. 9. The gas sections are also connected by reinforcing rim elements in the form of resilient hoops 169 which surround the outer end surfaces of the sections, within the peripheries of the sections, and which have high friction surfaces in contact with each other to prevent relative rotation between sections. These hoops are normally held in contact with each other by elastic cords 170 anchored to rings 171 which extend circumferentially around the gas bags adjacent their ends the hoops provide compression parts effective to resist compression forces between the sections caused by the cords 170 when bending occurs. The cords 170 are surrounded by a skirt or cover portion 116 providing a smooth transition for the joint and maintaining the generally streamline form of the airship. The arrangement is such that two adjacent sections of the airship can bend relative to each other, the fulcrum for bending being near the outer periphery of hoops 169; this bending is restrained by the elastic cords 171 and is accommodated by sliding of shafts 166 in tubes 165 while joint 164 serves to maintain a proper intersecting relationship between the axes of adjacent sections during bending. Bending of up to about 15° between adjacent sections is permitted, and the length of skirt 116 is of course sufficient to accommodate this. The minimum amount of bending considered desirable with this airship would be about 10°.

Unlike in the first embodiment, there is no overall cover for the airship; its outer surface is comprised of the outer surfaces of the separate sections and the skirts 116. This makes it relatively easy to remove or add a section when this is necessary for servicing or to lengthen or shorten the airship.

The tail section 114 is generally similar to that of the first embodiment having an axial structural member 118f, and air ballonets (not shown); again similar reference numerals, increased by 100, are used for corresponding parts. One addition is a pointed streamlined tail fairing 195.

Figure 19:
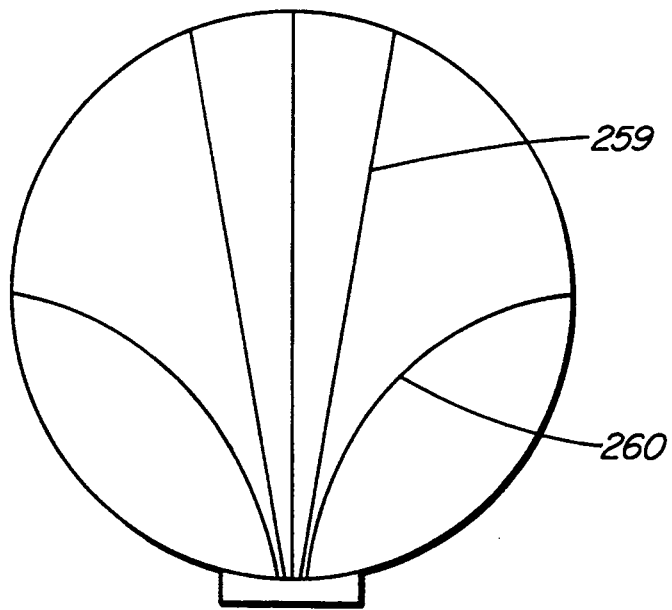
FIG. 19 shows a cross sectional view on line 19—19 of FIG. 18.
Figure 18:
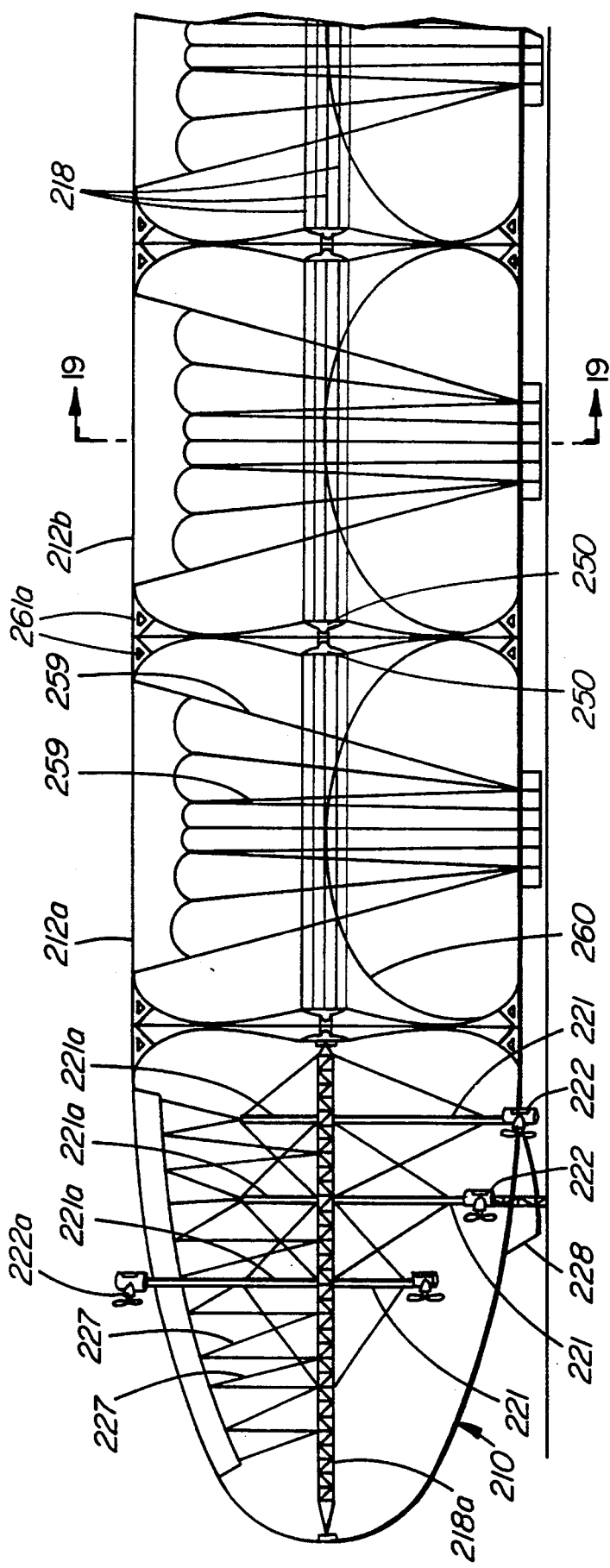
FIG. 18 shows a longitudinal section through the first two sections of a third airship.

FIGS. 18 to 20 show parts of a third embodiment of airship, generally similar to the second embodiment although somewhat larger. There are however two important differences between the third airship and the second; i.e.

1) The third airship has no rigid axial member in its intermediate sections, i.e. all those sections between the front section and the rear section; and 2) The third airship has no cover means extending between its sections.

Referring to FIG. 18, it will be seen that the front section 210 is similar to that of the second embodiment in having a central, axial, structural member 218a which supports radial members 221 which pass out through the sides of the section where they carry engines 222; in this embodiment 6 engines are provided below the centre-line of the airship and an additional engine 222a is mounted at the top, for directional control. Each engine is associated with a short wing section having a flap at the rear of the engine for directional control. The radial members 221 are stayed by cables held by king posts 221a. The axial member 218a is connected to the gas bag material by cables 227. The front section carries gondola 228, and also has air ballonets which are not shown but are similar to those shown at 20 in FIGS. 4–6.

The airship has four identical intermediate sections 212a, 212b etc., of which the first two are shown in FIGS. 18–20. These sections are somewhat similar to those of the second embodiment, although the length to diameter ratio is slightly less, namely about unity or slightly less. The main difference is that these sections do not have any rigid axial member; instead cables 218 are used to connect circular hub members 250 at the ends of the sections to maintain the sections at fixed length. Compared to sections having a rigid member, sections 212a etc. are easier to construct and to inflate; they can be delivered to site in a deflated axially collapsed condition, and then inflated, initially, with their ends surfaces in a horizontal plane before being rotated through 90° to the orientation shown. The external dimensions of the sections are determined by cables, some of which are shown at 259. Each section has a ballonet, as indicated in outlines at 260 in FIG. 19.

FIGS. 20a and 20b shows the means whereby adjacent sections are joined together.

Surrounding the end of each section is a hoop-like member 261 having an inner surface which is concave in cross-section to conform to the curved corner shape of the balloon fabric 215, and which has an outer cylindrical surface forming a continuation of the main cylindrical outer surface of the section. The members 261 also have flat or interfitting abutting surfaces so that they can fit together as shown in FIG. 20a when the airship is in its normal flying attitude; accordingly these provide a generally streamline transition between the sections and serve as compression parts suitable for resisting compression as the adjacent sections bend relative to each other. The alignment of adjacent sections is maintained by cables 270 held by winches 271. These winches are such as to provide a tension on the cables but allow these to be pulled out from the winches (at about a constant-tension) when an excessive bending force is applied to the airship; this condition being illustrated in FIG. 20b. Under such forces, sections will pivot about contact points at the peripheries of adjacent members 261.

Each hoop-like member 261 is connected by radial, spoke-like cables 262 to the circular hub member 250. These cables define the end shape of the balloon sections which bulge slightly between the cables. In addition to forming a hub for cables 262, members 250 provide a connecting means between adjacent sections, in manner comparable to the plates 150a and associated means of the second embodiment. Here, each plate member 250 has slidable therein a tubular member 266, 267, which are connected together by universal joint 268. This arrangement maintains the axes of the balloon sections in the correct intersecting relationship during bending. Tension in cables 270, along with friction between parts 261a, prevents relative rotation between sections. The surfaces 261 may be roughened or toothed to more positively prevent such relative rotation.

These connecting means allow a deflection of at least 10°, and preferably about 15°, between each section of the airship.

As indicated, in this embodiment no cover means are provided to bridge the gap between adjacent sections. This naturally will result in non-streamline flow whenever the airship sections becomes deflected relative to each other by excess sideways forces. However, the tension in cables 270 is maintained such that deflection only occurs in rather extreme conditions during which maintaining good speed is not of great importance.

The tail section (not shown) will be similar to that of the second embodiment, being provided with an axial structural member and with air ballonets.

A large airship as described, having say four intermediate sections, is not only structurally safer than a conventional large airship, due to its ability to bend, but is also expected to be economical in construction. This arises because the intermediate sections are all identical, and are structurally simple, being unencumbered with any propulsion means or control surfaces.

I claim:

1. An airship in the form of a self-powered, elongated dirigible, which comprises at least four buoyant gas containing sections connected end to end, each section having a fore-and-aft central axis, the sections being connected by articulated joints allowing limited articulation in any plane between adjacent sections up to at least 10° from the co-axial state, under gust conditions,; the sections including front and rear tapered sections and at least two identical cylindrical intermediate sections allowing modular construction of the airship, the front section having propulsion means and the intermediate sections having load carrying means but no propulsion means, said load carrying means being independent of any load carrying means of adjacent sections; said articulated joints including compression parts surrounding the ends of the adjacent sections and suitable for resisting primarily axially directed compression forces between said sections, and tension elements in the from of extensible means joining the peripheries of the adjacent sections, so that, on relative bending of the adjacent sections, tension forces in the extensible means are counteracted by compression forces between said compression parts, said extensible means being pre-tensioned to prevent any articulation of the sections until a predetermined bending force is exceeded; said articulated joints also including means for maintaining an intersecting relationship between the axes of said adjacent sections during bending and for preventing relative rotation between sections.

2. An airship according to claim 1, wherein said sections include spherical balloons, said joints including cover mans extending between the sections and providing a streamline exterior shape for the airship.

3. An airship according to claim 2, wherein at least a portion of the space between spherical balloons of adjacent sections and within the cover means is taken up with bags containing lifting gas at lower pressures than said spherical balloons.

4. An airship according to claim 1 wherein each section has a rigid fore and aft central structural member, adjacent ends of the structural members being connected by universal joints.

5. An airship according to claim 1 wherein the extensible means are elastic cables connecting outer peripheries of said sections.

6. An airship according to claim 1 wherein said extensible means are cables connected to powered winches and connecting outer peripheries of said sections.

7. An airship according to claim 1, wherein each of the gas containing sections has an internal ballonet and means for compressing air into said ballonet.

8. An airship according to claim 1, wherein said compression parts are in the form of hoop-like members.

9. An airship according to claim 1, wherein said compression parts are resilient.

10. An airship according to claim 1, wherein said intermediate sections have a length to diameter ratio of about 1:1.

11. An airship according to claim 1, wherein the front section is provided with an air ballonet for ballasting, with crew quarters, and with directional control means, and wherein said front section is connected to the next following section by separable coupling means and is such that it can be flown in controlled manner when separated from following sections.

12. An airship according to claim 1, wherein said intermediate sections have no rigid axial member and are capable of being provided in an axially collapsed condition.

13. An airship in the form of a self-powered, elongated dirigible, which comprises at least four buoyant gas containing sections, each section having a fore-and-aft central axis, the sections being connected by articulated joints including extensible means joining the peripheries of adjacent sections and allowing limited articulation in any plane between adjacent sections up to at least 10° from the co-axial state, under gust conditions; the sections including front and rear tapered sections and at least two intermediate cylindrical sections, the ends of adjacent sections having reinforcing rim elements which resist primarily axial compression forces between said sections and which prevent substantial relative rotation between sections, said rim elements being such as to mate together to provide a generally streamline transition between the two sections when the sections are co-axial; said extensible means being pretensioned to prevent any articulation of the sections until a predetermined bending force is exceeded.

14. An airship according to claim 13, wherein the front section has propulsion means and wherein the said intermediate sections have load carrying means but no propulsion means.

15. An airship according to claim 13, wherein each said intermediate section is generally cylindrical and has a length: diameter ratio of less than 1.5:1.0.

16. An airship according to claim 15 having at least three intermediate sections.

17. An airship according to claim 13, wherein said sections include a front section having at least three radially extending mountings each carrying propulsion means and associated movable flaps for control of direction.

18. An airship according to claim 1, wherein each of the sections is provided with mooring means.

19. An airship according to claim 1, wherein said front section is provided with an air ballonet for ballasting, with crew quarters, and with directional control means, and wherein said front section is connected to the next following section by separable coupling means and is such that it can be flown in controlled manner when separated from following sections.

20. An airship according to claim 13, wherein each of the sections is provided with mooring means.

21. An airship according to claim 13, wherein said cover means comprises skirts which bridge any gaps between adjacent sections and which are each individual to a joint between adjacent sections so as not to interfere with separation of sections at other joints.

* * * * *